United States Patent
Bak et al.

(10) Patent No.: US 12,510,022 B2
(45) Date of Patent: Dec. 30, 2025

(54) GAS TURBINE PLANT WITH AMMONIA DECOMPOSITION SYSTEM

(71) Applicant: DOOSAN ENERBILITY CO., LTD., Changwon-si (KR)

(72) Inventors: Byoung Gu Bak, Suwon-si (KR); Jin Il Kim, Changwon-si (KR); Tae Woo Kim, Yongin-si (KR); Hong Geun Ha, Yongin-si (KR); Young Hoon Bae, Changwon-si (KR); Chil Yeong Seon, Yongin-si (KR); Ki Hyun Lee, Daegu (KR); Kwang Hun Jeong, Gimhae-si (KR)

(73) Assignee: Doosan Enerbility Co., Ltd., Changwon-si (KR)

( * ) Notice: Subject to any disclaimer, the term of this patent is extended or adjusted under 35 U.S.C. 154(b) by 0 days.

(21) Appl. No.: 18/677,375

(22) Filed: May 29, 2024

(65) Prior Publication Data
US 2024/0401519 A1 Dec. 5, 2024

(30) Foreign Application Priority Data
May 30, 2023 (KR) .......................... 10-2023-0069373

(51) Int. Cl.
*F02C 3/22* (2006.01)
*F02C 6/18* (2006.01)
*F02C 7/224* (2006.01)
*F02C 9/40* (2006.01)

(52) U.S. Cl.
CPC .................. *F02C 3/22* (2013.01); *F02C 6/18* (2013.01); *F02C 7/224* (2013.01); *F02C 9/40* (2013.01); *F05D 2220/62* (2013.01); *F05D 2260/213* (2013.01)

(58) Field of Classification Search
CPC ...... F02C 9/40; F02C 3/22; F02C 6/04; F02C 6/10; F02C 6/18; F02C 7/224; F23R 3/36; F23R 3/40; C01B 3/047; C01B 3/04
See application file for complete search history.

(56) References Cited

U.S. PATENT DOCUMENTS

| | | | |
|---|---|---|---|
| 5,852,925 A | 12/1998 | Prasad et al. | |
| 11,156,168 B2 | 10/2021 | Nose | |
| 11,679,977 B2 | 6/2023 | Al-Huwaider | |
| 11,912,574 B1 * | 2/2024 | Jo | ........................... C01B 3/047 |
| 11,939,915 B2 | 3/2024 | Uechi | |
| 2007/0214766 A1 | 9/2007 | Obana | |
| 2018/0355794 A1 | 12/2018 | Bulat | |

(Continued)

FOREIGN PATENT DOCUMENTS

| | | |
|---|---|---|
| CN | 119222016 A | 12/2024 |
| EP | 4227501 A1 | 8/2023 |

(Continued)

*Primary Examiner* — Devon C Kramer
*Assistant Examiner* — Jingchen Liu
(74) *Attorney, Agent, or Firm* — Shook, Hardy & Bacon L.L.P.

(57) ABSTRACT

The present disclosure relates to a gas turbine plant which decomposes ammonia and supplies it as fuel to a combustor of a gas turbine. The gas turbine plant supplies sufficient heat to the ammonia in order to thermally decompose the ammonia effectively, and separates the residual ammonia present in the decomposition gas and supplies it to a combustor of the gas turbine.

8 Claims, 11 Drawing Sheets

(56) References Cited

U.S. PATENT DOCUMENTS

| | | |
|---|---|---|
| 2019/0084831 A1 | 3/2019 | Andersen |
| 2019/0107048 A1 | 4/2019 | Bulat |
| 2020/0032676 A1* | 1/2020 | Nose .................. F23R 3/36 |
| 2021/0332759 A1 | 10/2021 | Smith |
| 2022/0099021 A1 | 3/2022 | Uechi |
| 2022/0154646 A1 | 5/2022 | Araki |
| 2022/0162989 A1 | 5/2022 | Cocks |
| 2022/0162999 A1* | 5/2022 | Cocks .................. F23R 3/36 |
| 2022/0299205 A1 | 9/2022 | MacDonald |
| 2023/0129294 A1 | 4/2023 | Cocks |
| 2023/0313735 A1 | 10/2023 | Smith |
| 2023/0407784 A1 | 12/2023 | Takeishi |
| 2024/0019124 A1 | 1/2024 | Ito |
| 2024/0068416 A1 | 2/2024 | Hagita |
| 2024/0093639 A1 | 3/2024 | Ikeda |
| 2024/0117763 A1 | 4/2024 | Ito |
| 2024/0167417 A1 | 5/2024 | Lin |
| 2024/0183310 A1* | 6/2024 | Uechi .................. F01K 23/10 |
| 2024/0328358 A1 | 10/2024 | Barth |

FOREIGN PATENT DOCUMENTS

| | | |
|---|---|---|
| JP | 2948351 A | 9/1999 |
| JP | 2015021499 A | 2/2015 |
| JP | 2016085189 A | 5/2016 |
| JP | 2018076794 A | 5/2018 |
| JP | 2020147478 A | 9/2020 |
| JP | 2020148183 A | 9/2020 |
| KR | 20130071099 A | 6/2013 |
| KR | 20140001773 A | 1/2014 |
| KR | 20210096274 A | 8/2021 |
| KR | 20210121192 A | 10/2021 |
| KR | 20220141943 A | 10/2022 |
| KR | 20230060372 A | 5/2023 |
| WO | 2023162600 A1 | 8/2023 |
| WO | 2024100987 A1 | 5/2024 |

* cited by examiner

GAS TURBINE PLANT WITH AMMONIA DECOMPOSITION SYSTEM

CROSS-REFERENCE TO RELATED APPLICATIONS

The present application claims priority to Korea Patent Application No. 10-2023-0069373, filed May 30, 2023, the entire contents of which is incorporated herein for all purposes by this reference.

FIELD

The present disclosure relates to a gas turbine plant with an ammonia decomposition system and more particularly to a gas turbine plant which decomposes ammonia and supplies it as fuel to a combustor of the gas turbine.

BACKGROUND

For the purpose of reducing the emission amount of carbon dioxide in order to preserve global environment, it is a promising option to use hydrogen as a fuel which does not emit carbon dioxide even when combusted. However, compared to a fuel such as liquefied natural gas which is widely used as a fuel for a gas turbine, hydrogen is not easy to transport or store. Therefore, it is being considered that ammonia that can be converted to hydrogen is used as a fuel.

Japanese Patent No. 2948351 discloses a gas turbine plant equipped with a decomposition device that heats ammonia and decomposes it into hydrogen and nitrogen. The decomposition device of the gas turbine plant heats ammonia by performing heat exchange between liquid ammonia with pressure increased by a pressure pump and exhaust gas discharged from the gas turbine, thereby thermally decomposing the ammonia into decomposition gas containing hydrogen and nitrogen. This decomposition gas is supplied as it is to a combustor of the gas turbine.

However, the liquid ammonia may not be sufficiently heated by the exhaust gas. In this case, a large amount of ammonia in addition to hydrogen and nitrogen often remains in the decomposition gas. When the decomposition gas is supplied to the combustor of the gas turbine and the residual ammonia is combusted, there is a problem that a large amount of nitrogen oxides (NOx) is generated.

SUMMARY

The purpose of the present disclosure is to provide a gas turbine plant that decomposes ammonia and supplies it as fuel to a combustor of a gas turbine. The gas turbine plant supplies sufficient heat to the ammonia in order to thermally decompose the ammonia effectively, and separates the residual ammonia present in the decomposition gas and supplies it to a combustor of the gas turbine.

The technical problem to be overcome in this document is not limited to the above-mentioned technical problems. Other technical problems not mentioned can be clearly understood from those described below by a person having ordinary skill in the art.

One embodiment is a gas turbine plant with an ammonia decomposition system. The gas turbine plant includes: a storage tank configured to store liquid ammonia; a supply pump configured to supply the liquid ammonia of the storage tank; a preheater configured to preheat the liquid ammonia supplied by the supply pump; a vaporizer configured to vaporize the liquid ammonia preheated by the preheater; a first superheater configured to superheat gaseous ammonia vaporized by the vaporizer; a first decomposition reactor configured to thermally decompose the gaseous ammonia superheated by the first superheater; and a separator configured to separate residual ammonia from decomposition gas decomposed by the first decomposition reactor. Synthesis gas consisting of hydrogen and nitrogen with the residual ammonia removed by the separator is supplied to a first combustor of a gas turbine. A portion of exhaust gas discharged from the gas turbine supplies heat while passing through the first decomposition reactor.

The residual ammonia separated by the separator may be mixed with the gaseous ammonia vaporized by the vaporizer and may be supplied to the first superheater.

The exhaust gas that has passed through the first decomposition reactor may supply heat while passing through the first superheater.

The exhaust gas discharged from the gas turbine may be supplied to a heat recovery steam generator. Water or steam heated by the heat of the exhaust gas in the heat recovery steam generator may supply heat while passing through at least one of the preheater, the vaporizer, and the first superheater, and then may be recovered back to the heat recovery steam generator.

The exhaust gas discharged from the gas turbine may be branched and a portion of the exhaust gas may be supplied to the first decomposition reactor, and the other portion may be supplied to a heat recovery steam generator.

The exhaust gas discharged from the gas turbine may be supplied to a heat recovery steam generator through the first decomposition reactor.

The decomposition gas may be supplied to the separator after supplying heat through at least one of the preheater, the vaporizer, and the first superheater from the first decomposition reactor.

Air supplied to a compressor of the gas turbine may supply heat while passing through the preheater before being supplied to the compressor.

A heat transfer fluid may absorb heat from air supplied to a compressor of the gas turbine and may supply the heat to the liquid ammonia in the preheater.

The gas turbine plant may further include a second decomposition reactor that thermally decomposes the gaseous ammonia or thermally decomposes the residual ammonia contained in the decomposition gas decomposed in the first decomposition reactor. The decomposition gas decomposed in the second decomposition reactor may be supplied to the separator.

The gas turbine plant may further include a second combustor that generates the combustion gas to supply heat to the second decomposition reactor.

The gas turbine plant may further include a second superheater that superheats the gaseous ammonia or the decomposition gas which is supplied to the second decomposition reactor. The combustion gas may supply heat while passing through the second decomposition reactor and the second superheater.

The second decomposition reactor may be arranged in series downstream of the first decomposition reactor, and the decomposition gas discharged from the first decomposition reactor may be supplied to the second decomposition reactor through the second superheater.

The second decomposition reactor may be arranged in parallel with the first decomposition reactor, and the gaseous ammonia superheated through the first superheater and the second superheater may be divided and supplied to the first decomposition reactor and the second decomposition reactor.

The combustion gas that has supplied heat while passing through the second decomposition reactor and the second superheater may be mixed with the exhaust gas that has supplied heat while passing through the first decomposition reactor, and may supply heat while passing through the first superheater.

The decomposition gas discharged from the first decomposition reactor and the decomposition gas discharged from the second decomposition reactor may be mixed and supplied to the separator.

A portion of the decomposition gas supplied to the separator or a portion of the synthesis gas from which the residual ammonia has been removed in the separator may be supplied to the second combustor and combusted.

A portion of the decomposition gas or a portion of the synthesis gas may be expanded by a gas expander before being supplied to the second combustor.

A portion of the liquid ammonia or a portion of the gaseous ammonia may be supplied to the second combustor and combusted.

A portion of the gaseous ammonia may be expanded by a gas expander before being supplied to the second combustor.

The ammonia decomposition system includes the preheater, the vaporizer, and the first superheater, which are for heating the ammonia before the first decomposition reactor, so that sufficient heat can be supplied to the ammonia.

Also, in addition to the first decomposition reactor and the first superheater, the second decomposition reactor and the second superheater are provided, and the combustion gas generated by the separate second combustor supplies heat to the second decomposition reactor. Accordingly, the ammonia can be effectively thermally decomposed at a higher temperature. In particular, when the first and second decomposition reactors are arranged in series, the residual ammonia present in the decomposition gas decomposed in the first decomposition reactor is decomposed once more in the second decomposition reactor, thereby maximizing the amount of the synthesis gas, that is to say, hydrogen used as fuel.

Also, a portion of the ammonia, the decomposition gas or the synthesis gas present in the ammonia decomposition system is supplied as fuel to the second combustor, so that no separate fuel such as fossil fuel, etc., is required.

Also, the decomposition gas, the air supplied to the compressor of the gas turbine, or the water or steam heated in the heat recovery steam generator is used as a heat source for supplying heat to some components (preheater, vaporizer, etc.) of the ammonia decomposition system, so that the efficiency of the plant can be increased.

The effect of the present disclosure is not limited to the above effects and should be construed as including all the effects that can be inferred from the configuration of the present disclosure disclosed in the detailed description or claims of the present disclosure.

DETAILED DESCRIPTION

Figure 1:
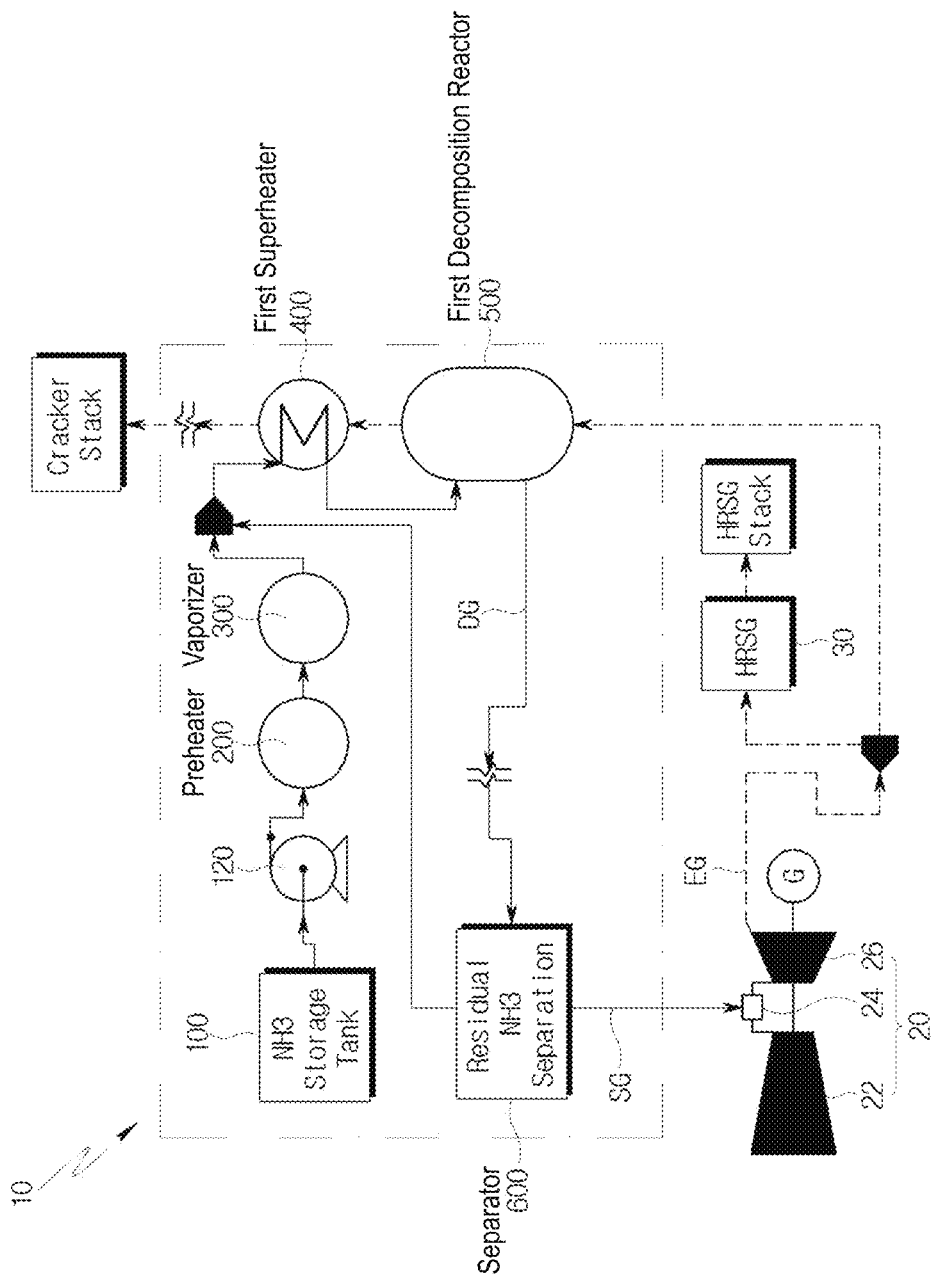
FIG. 1 is a schematic diagrams of a gas turbine plant with an ammonia decomposition system according to an embodiment.

Hereinafter, preferable embodiments of a gas turbine plant with an ammonia decomposition system will be described with reference to accompanying drawings.

Also, the below-mentioned terms are defined in consideration of the functions in the present disclosure and may be changed according to the intention of users or operators or custom. The following embodiments do not limit the scope of the present disclosure and are merely exemplary of the components presented in the claims of the present disclosure.

Parts irrelevant to the description will be omitted for a clear description of the present disclosure. The same or similar reference numerals will be assigned to the same or similar components throughout this specification. Throughout this specification, when it is mentioned that a portion "includes" an element, it means that the portion does not exclude but further includes other elements unless there is a special opposite mention.

First, a gas turbine plant including an ammonia decomposition system according to an embodiment of the present disclosure will be described with reference to FIG. 1.

The gas turbine plant according to the embodiment generally includes an ammonia decomposition system 10, a gas turbine 20, and a heat recovery steam generator (HRSG) 30.

The ammonia decomposition system 10 includes a storage tank 100, a supply pump 120, a preheater 200, a vaporizer 300, a first superheater 400, a first decomposition reactor 500, and a separator 600.

The gas turbine 20 includes a compressor 22 for compressing air to high pressure, a first combustor 24 for mixing the air compressed by the compressor 22 with fuel and for combusting, and a turbine 26 for generating power while rotating turbine blades by using high-temperature and high-pressure combustion gas discharged from the first combustor 24.

In the embodiment of the present disclosure, synthesis gas based on hydrogen decomposed in the ammonia decomposition system 10 as a main component is supplied as fuel for the first combustor 24. While the figure shows that only the synthesis gas is supplied. However, in some cases, it is also possible that the synthesis gas and natural gas are supplied to the second combustor 24 together and mixed and combusted.

Exhaust gas (EG) discharged from the turbine 26 of the gas turbine 20 is supplied to the heat recovery steam generator 30 and vaporizes water into steam within the heat recovery steam generator 30. The steam generated in the heat recovery steam generator 30 is supplied to a steam turbine (not shown) and produces electric power.

Hereinafter, each component of the ammonia decomposition system 10 will be described in detail. FIG. 1 shows a flow of ammonia or ammonia-decomposed gas passing through the components of the ammonia decomposition system 10, and adjacent components will be connected to each other through connection pipes, etc.

The storage tank 100 stores liquid ammonia, and the supply pump 120 increases the pressure of the liquid ammonia of the storage tank 100 and supplies the liquid ammonia to the preheater 200.

Subsequently, the preheater 200, the vaporizer 300, and the first superheater 400 are configured to vaporize and heat the liquid ammonia prior to the first decomposition reactor 500. Specifically, the preheater 200 preheats the liquid ammonia supplied by the supply pump 120. The vaporizer 300 vaporizes the liquid ammonia preheated by the preheater 200. The first superheater 400 superheats gaseous ammonia vaporized by the vaporizer 300.

As one example, when the supply pump 120 increases the pressure of the liquid ammonia to 40 atm, the boiling point of the ammonia at 40 atm is around 100° C. In this case, the preheater 200 heats the liquid ammonia to below the boiling point, and the vaporizer 300 heats the liquid ammonia to the boiling point and generates gaseous ammonia. The first superheater 400 additionally heats the gaseous ammonia.

The first decomposition reactor 500 thermally decomposes the gaseous ammonia superheated by the first superheater 400 and generates decomposition gas (DG) containing hydrogen, nitrogen, and residual ammonia. A catalyst that promotes the thermal decomposition of the ammonia may be filled in the first decomposition reactor 500. The catalyst has a catalyst component that activates a decomposition reaction, and a carrier that supports the catalyst component. An example of the catalyst component includes particles of precious metal such as Ru, etc., and metal particles including transition metals such as Ni, Co, and Fe, etc. The carrier includes a metal oxide such as $Al_2O_3$, $ZrO_2$, $Pr_2O_3$, $La_2O_3$, MgO, etc. The catalyst is not limited to the catalysts exemplified above as long as the catalyst activates the decomposition reaction of ammonia.

The separator 600 separates residual ammonia from the decomposition gas (DG) decomposed by the first decomposition reactor 500. Then, the residual ammonia is removed in the separator 600, the synthesis gas (SG) consisting of hydrogen and nitrogen is supplied to the first combustor 24 of the gas turbine. Here, the residual ammonia separated by the separator 600 may be mixed with the gaseous ammonia vaporized by the vaporizer 300 and may be supplied to the first superheater 400. Since ammonia is highly soluble in water, the separator 600 can remove the residual ammonia by dissolving the residual ammonia in water. Also, ammonia is easier to evaporate than water. Therefore, when ammonia water that is obtained by dissolving the residual ammonia in water is heated, gaseous ammonia can be separated again.

Here, a reaction temperature for the thermal decomposition of the ammonia (depending on the catalyst, generally 400° C. to 700° C.) is much higher than the boiling point of ammonia. Therefore, the first superheater 400 and the first decomposition reactor 500 relatively more require a heat source with a high temperature than the preheater 200 and the vaporizer 300.

Accordingly, in the embodiment, at least a portion of the exhaust gas (EG) discharged from the gas turbine 20 supplies heat while passing through the first decomposition reactor 500 and the first superheater 400 in turn. Specifically, the exhaust gas (EG) discharged from the gas turbine 20 is branched and a portion of the exhaust gas (EG) is supplied to the first decomposition reactor 500, and the other portion is supplied to the heat recovery steam generator 30. Depending on the embodiment, the exhaust gas (EG) may additionally pass through the preheater 200 or vaporizer 300.

Figure 2:
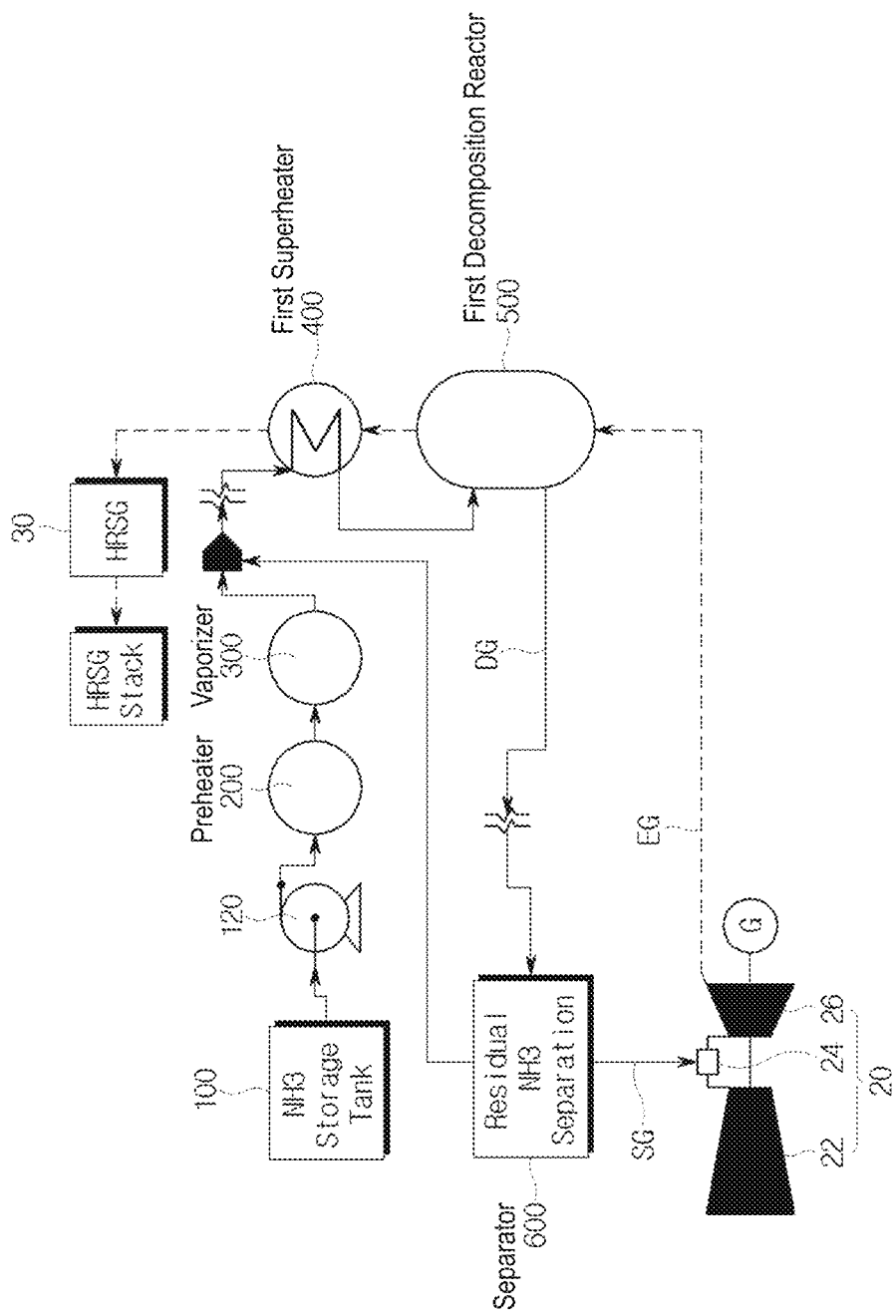
FIG. 2 is a schematic diagram of a gas turbine plant with an ammonia decomposition system according to an embodiment.

However, the embodiment is not limited to this. As shown in FIG. 2, the exhaust gas (EG) discharged from the gas turbine 20 may supply heat while passing through the first decomposition reactor 500 and the first superheater 400 in turn, and then may be supplied to the heat recovery steam generator 30.

As such, the ammonia decomposition system 10 may include the preheater 200, the vaporizer 300, and the first superheater 400, which are for heating the ammonia before the first decomposition reactor 500, and the exhaust gas (EG) supplies heat to the first decomposition reactor 500. Accordingly, sufficient heat can be supplied to the ammonia and the ammonia can be thermally decomposed effectively.

Accordingly, there is not much residual ammonia in the decomposition gas (DG), and the residual ammonia is reliably removed through the separator 600 and the decomposition gas (DG) is supplied to the first combustor 24, thereby reducing nitrogen oxides in the exhaust gas (EG).

Figure 3:
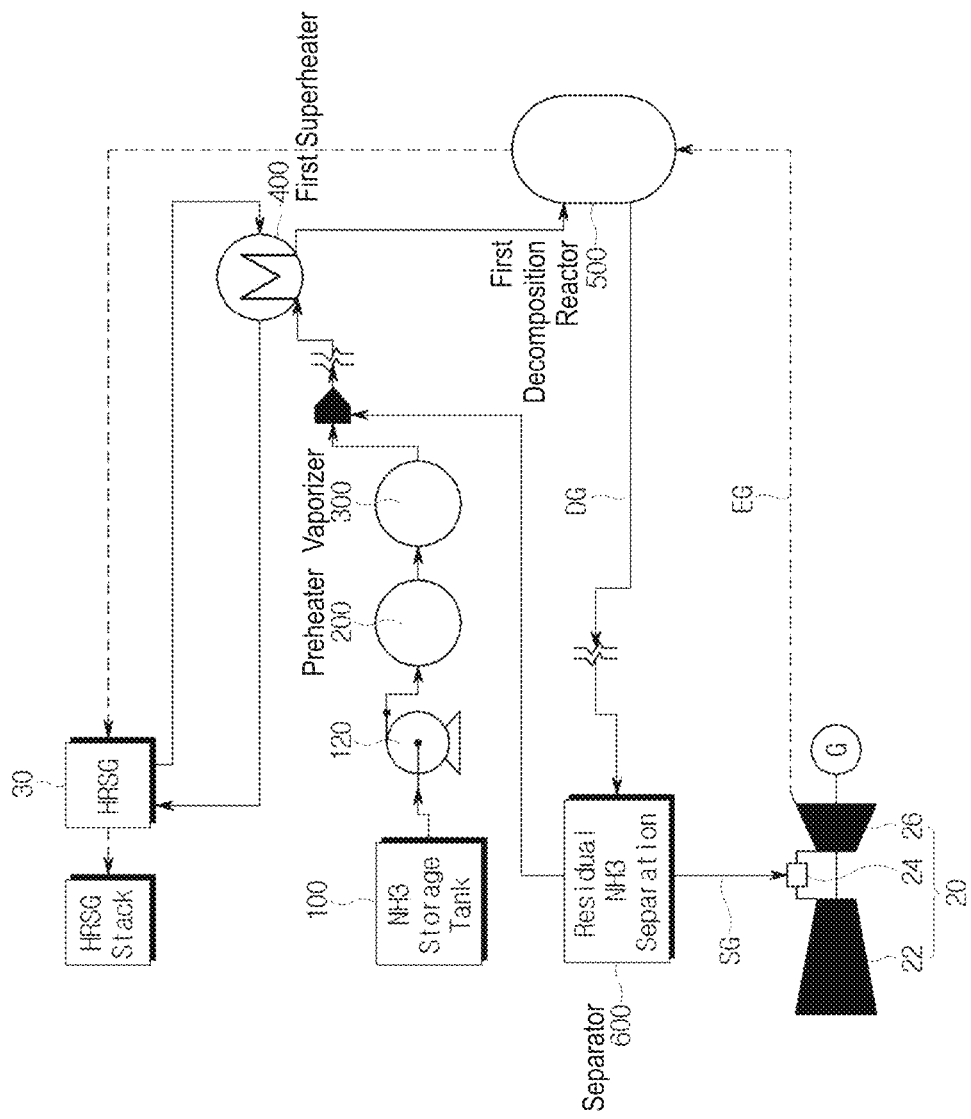
FIG. 3 is a schematic diagram of a gas turbine plant with an ammonia decomposition system according to an embodiment.

Next, according to the embodiment shown in FIG. 3, as shown in FIG. 2, all of the exhaust gas (EG) discharged from the gas turbine 20 is supplied to the first decomposition reactor 500 and supplies heat, and then is supplied to the heat recovery steam generator 30 without passing through the first superheater 400. Here, the first superheater 400 may be supplied with heat by water or steam heated by heat of the exhaust gas (EG) in the heat recovery steam generator 30.

Specifically, steam generated by the heat of the exhaust gas (EG) in the heat recovery steam generator 30 is supplied to a steam turbine (not shown) to drive the steam turbine. Here, a portion of the heated water is pulled out from the middle of the heat recovery steam generator 30 and is supplied to the first superheater 400, or a portion of the steam supplied to the steam turbine is pulled out downstream of the heat recovery steam generator 30 and supplied to the first superheater 400. In addition, a portion of the steam discharged after driving the steam turbine may be pulled out and supplied to the first superheater 400. The water or steam that has supplied heat to the gaseous ammonia in the first superheater 400 may be recovered back to the heat recovery steam generator 30. In particular, since the water or steam extracted from the heat recovery steam generator 30 is cooled while passing through the first superheater 400, the water or steam can be returned to a location where the temperature of the water or steam is lower than the temperature of a location where the water or steam is extracted within the heat recovery steam generator 30.

According to this, the efficiency of the plant can be increased by using high-temperature water or steam as a heat source for superheating the gaseous ammonia before thermal decomposition.

Although not shown, the water or steam extracted from the heat recovery steam generator 30 may supply heat while passing through the preheater 200 or vaporizer 300. In some cases, the water or steam extracted from the heat recovery steam generator 30 may supply heat while continuously passing through a combination of two or more of the preheater 200, the vaporizer 300, and the first superheater 400.

The following embodiments will focus on differences from the embodiment shown in FIG. 1.

Figure 4:
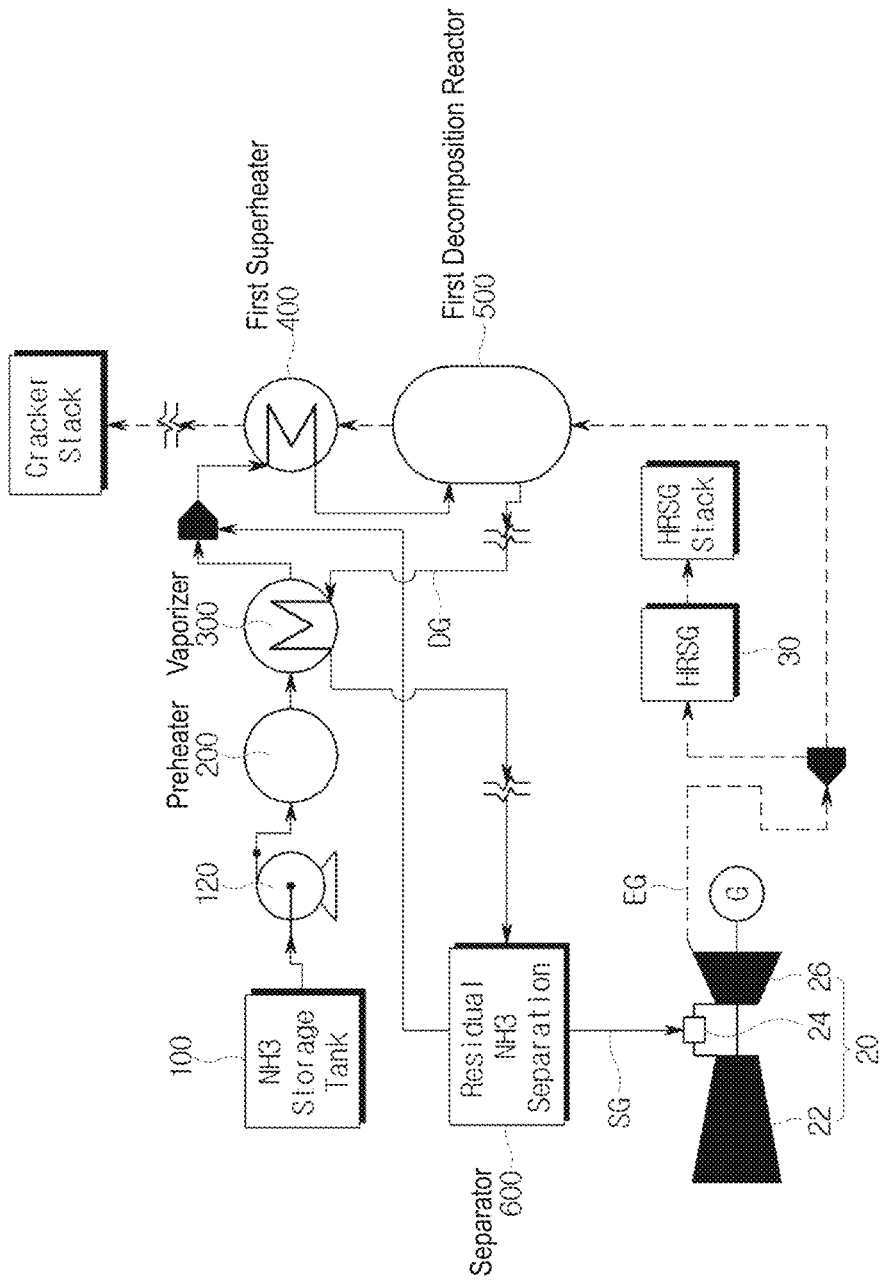
FIG. 4 is a schematic diagram of a gas turbine plant with an ammonia decomposition system according to an embodiment.

According to the embodiment shown in FIG. 4, the decomposition gas (DG) is not immediately supplied from the first decomposition reactor 500 to the separator 600, but is supplied to the separator 600 after supplying heat through the vaporizer 300 from the first decomposition reactor 500. In this way, the efficiency of the plant can be increased by using the decomposition gas (DG) as a heat source for the vaporizer 300. Although not shown, it is possible that the decomposition gas (DG) may supply heat while passing through the preheater 200 or the first superheater 400. In some cases, the decomposition gas (DG) may supply heat while continuously passing through two or more of the preheater 200, the vaporizer 300, and the first superheater 400. In aspects when the decomposition gas (DG) passes through the first superheater 400, the exhaust gas (EG) will not pass through the first superheater 400.

Figure 5:
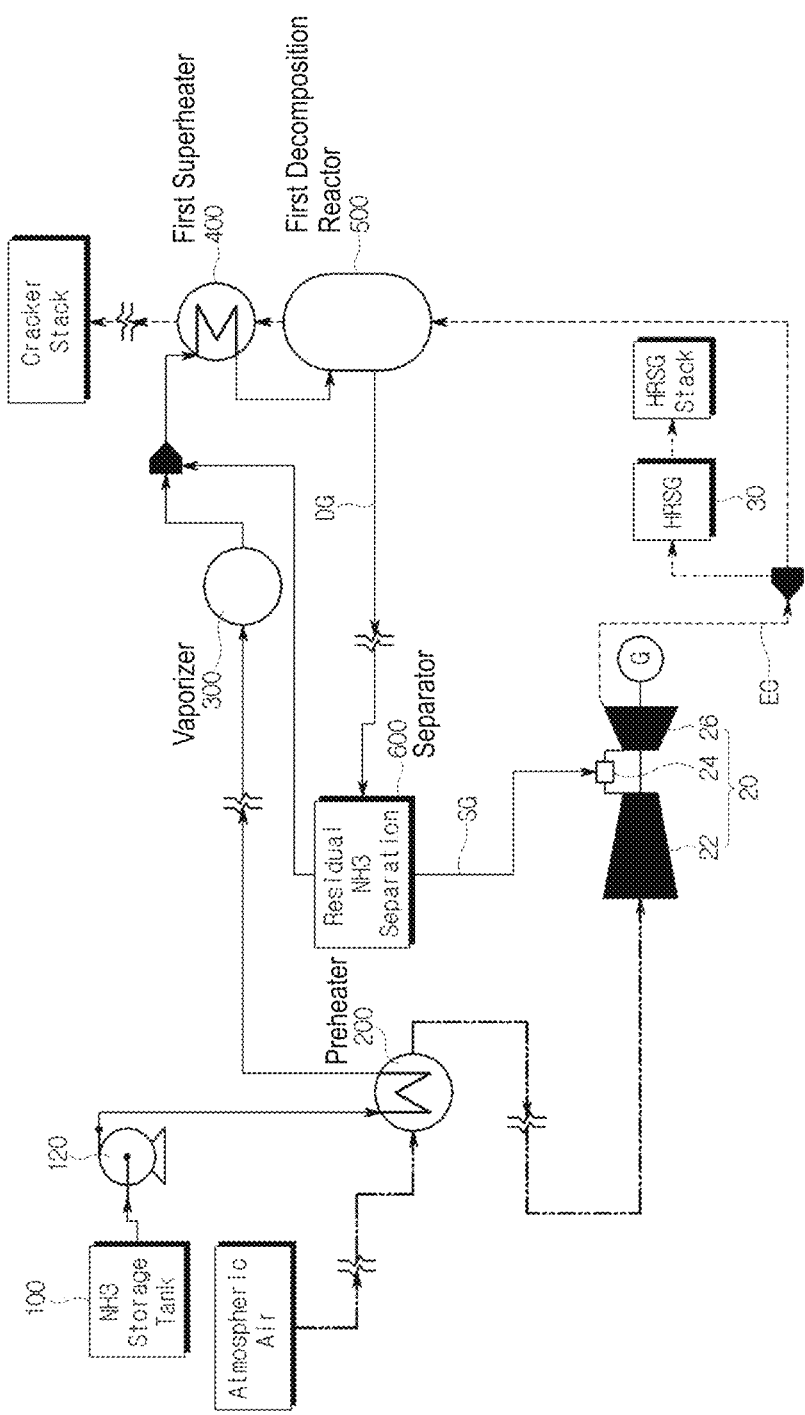
FIG. 5 is a schematic diagram of a gas turbine plant with an ammonia decomposition system according to an embodiment.
Figure 6:
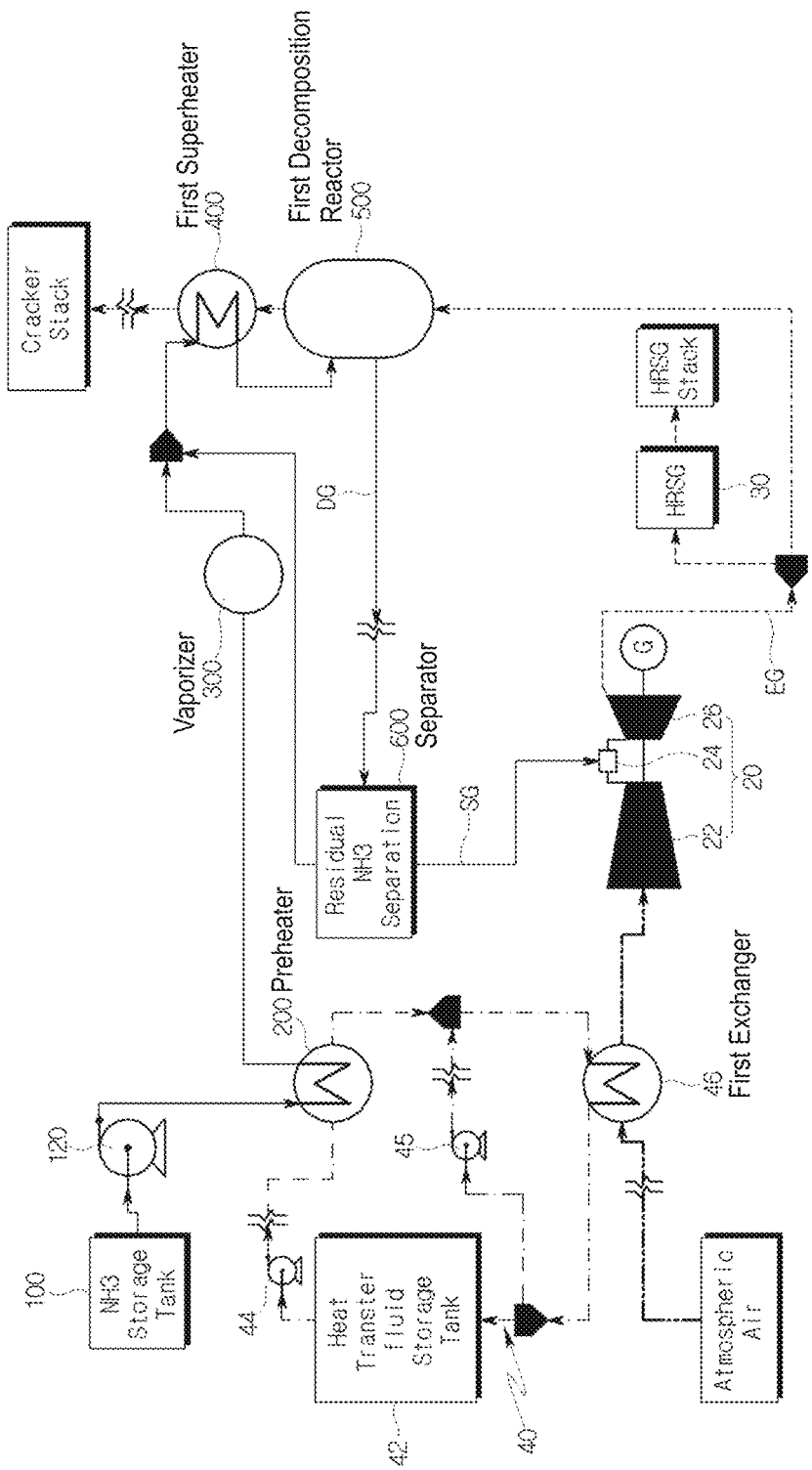
FIG. 6 is a schematic diagram of a gas turbine plant with an ammonia decomposition system according to an embodiment.

Next, according to the embodiments shown in FIGS. 5 and 6, air supplied to the compressor 22 of the gas turbine exchanges heat directly or indirectly with the liquid ammonia.

Specifically, in FIG. 5, the air supplied to the compressor 22 of the gas turbine supplies heat while passing through the preheater 200 before being supplied to the compressor 22. That is, the air supplied to the compressor 22 and the liquid ammonia within the preheater 200 directly exchange heat. In the embodiment, since the air is supplied to the compressor 22, air at room temperature is cooled while passing through the preheater 200 and is supplied to the compressor 22. As such, the liquid ammonia within the preheater 200 is preheated by using the air supplied to the compressor 22, so that the output of the compressor 22 can be improved and the efficiency of the plant can be increased.

In FIG. 6, a heat transfer fluid absorbs heat from the air supplied to the compressor 22 of the gas turbine and supplies the heat to the liquid ammonia in the preheater 200. That is, the air supplied to the compressor 22 and the liquid ammonia within the preheater 200 indirectly exchange heat through the heat transfer fluid. The heat transfer fluid must be a liquid that does not freeze even at the temperature of the liquid ammonia. For example, the heat transfer fluid may be anti-freeze.

Specifically, a heat transfer fluid circuit 40 in which the heat transfer fluid circulates may include a storage tank 42 where the heat transfer fluid is stored, a pump 44, the preheater 200, and a first heat exchanger 46, and they are connected in series. The heat transfer fluid may be heated while exchanging heat with the air at room temperature in the first heat exchanger 46, and may be cooled while exchanging heat with the liquid ammonia in the preheater 200. Here, the heat transfer fluid may fall below zero temperature while exchanging heat with the liquid ammonia in the preheater 200, and when the sub-zero heat transfer fluid is supplied to the first heat exchanger 46 and exchanges heat with the air at room temperature, water vapor contained in the atmosphere sublimates and freezes, and particles may be produced. Accordingly, for the purpose of preventing this, the heat transfer fluid circuit 40 may further include an additional pump 45 in a line disposed in parallel with the pump 44 and the preheater 200. In this case, a portion of the heat transfer fluid that has come from the first heat exchanger 46 is branched, and bypassed without passing through the preheater 200, and then joins the heat transfer fluid that has passed through the preheater 200, so that the above-zero heat transfer fluid can be supplied to the first heat exchanger 46.

Besides, although not shown, the first heat exchanger 46 is replaced with an injection unit and a portion of the heat transfer fluid may be partially sprayed onto the room temperature air without the heat exchange between the heat transfer fluid and the room temperature air. In this case, the heat transfer fluid may be additionally replenished in the storage tank 42 as much as the amount of the sprayed heat transfer fluid.

Next, according to the embodiments shown in FIGS. 7 to 11, the ammonia decomposition system 10 further includes a second decomposition reactor 700 that thermally decomposes the gaseous ammonia or thermally decomposes residual ammonia contained in the decomposition gas (DG) decomposed in the first decomposition reactor 500.

Also, if necessary, the ammonia decomposition system 10 may further include a second combustor 800 that generates the combustion gas (CG) to supply heat to the second decomposition reactor 700. The combustion gas (CG) generated in the second combustor 800 generally has a temperature of about 1000° C., which is higher than the temperature of the exhaust gas (EG) discharged from the gas turbine 20. Therefore, when the combustion gas (CG) is used including the separate second combustor 800, the ammonia can be effectively thermally decomposed in the second decomposition reactor 700 without using a high-performance catalyst, and the efficiency of the second decomposition reactor 700 can be improved.

Also, if necessary, the ammonia decomposition system 10 may further include a second superheater 900 that superheats the gaseous ammonia or decomposition gas which is supplied to the second decomposition reactor 700. The combustion gas (CG) generated in the second combustor 800 may supply heat while passing through the second decomposition reactor 700 and the second superheater 900. However, the embodiment is not limited to this, and the combustion gas (CG) may additionally pass through the preheater 200 or the vaporizer 300.

Figure 7:
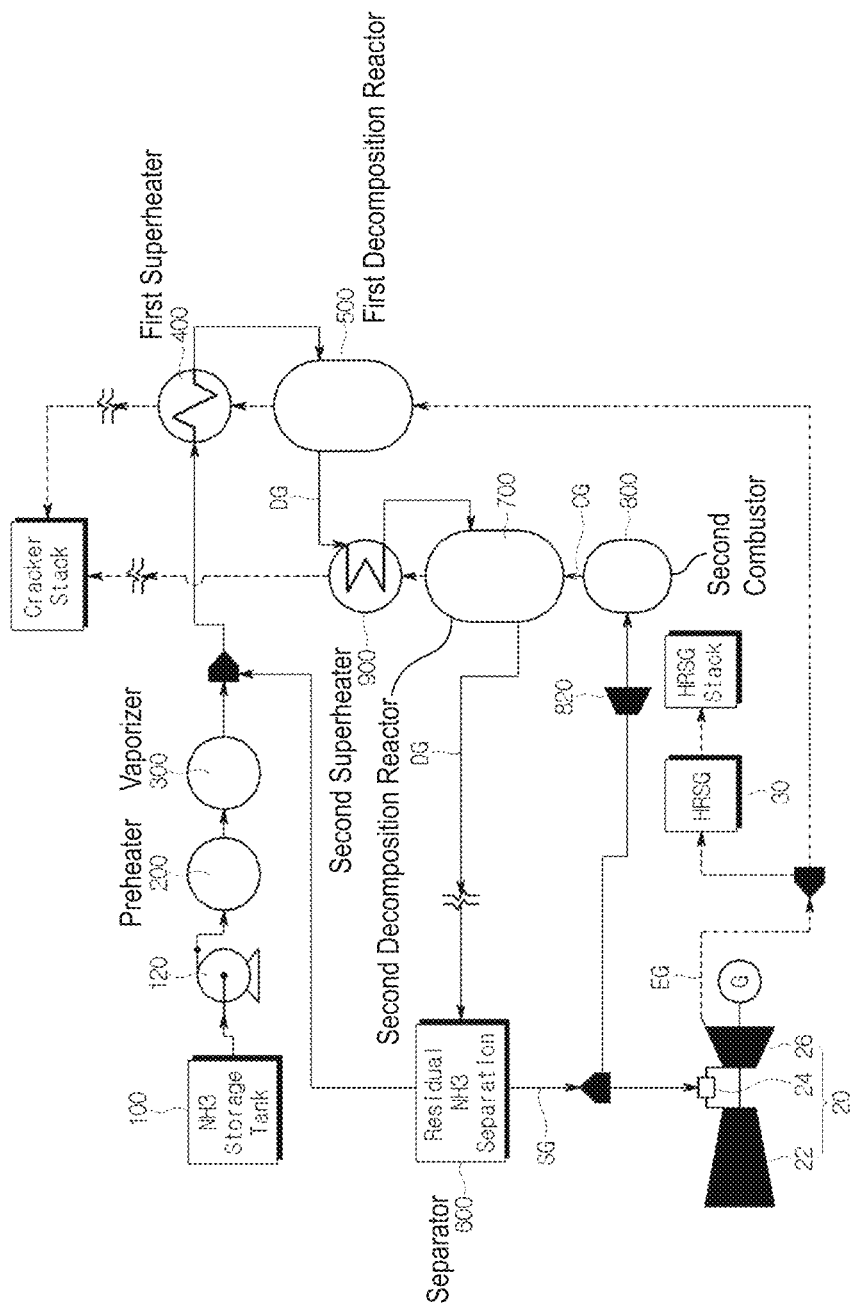
FIG. 7 is a schematic diagram of a gas turbine plant with an ammonia decomposition system according to an embodiment.

First, referring to FIG. 7, the second decomposition reactor 700 is arranged in series downstream of the first decomposition reactor 500. Accordingly, the decomposition gas (DG) discharged from the first decomposition reactor 500 is supplied to the second decomposition reactor 700 through the second superheater 900. The second decomposition reactor 700 thermally decomposes the residual ammonia contained in the decomposition gas (DG) decomposed in the first decomposition reactor 500, and the decomposition gas (DG) finally decomposed in the second decomposition reactor 700 is supplied to the separator 600.

As such, in addition to the first decomposition reactor 500 and the first superheater 400, the second decomposition reactor 700 and the second superheater 900 are provided, and the combustion gas (CG) generated by the separate second combustor 800 supplies heat to the second decomposition reactor 700. Accordingly, the ammonia can be effectively thermally decomposed at a higher temperature.

In particular, when the first and second decomposition reactors 500 and 700 are arranged in series, the residual ammonia present in the decomposition gas (DG) decomposed in the first decomposition reactor 500 is decomposed once more in the second decomposition reactor 700, thereby maximizing the amount of the synthesis gas, that is to say, hydrogen used as fuel.

Separate fuel such as fossil fuel may be supplied to the second combustor 800. However, it is desirable that a portion of the ammonia, the decomposition gas (DG) or the synthesis gas (SG) present in the ammonia decomposition system 10 should be supplied as fuel to the second combustor 800 in order that the system is simplified and carbon dioxide is not emitted.

In the embodiment, a portion of the synthesis gas (SG) from which the residual ammonia has been removed in the separator 600 is supplied to the second combustor 800 and combusted. Although not shown, air may be supplied to the second combustor 800 in order to supply an oxidant (oxygen). Alternatively, since a large amount of residual oxygen exists in the exhaust gas (EG), a portion of the exhaust gas (EG) may be supplied as an oxidant to the second combustor 800. If necessary, it is possible that the exhaust gas (EG) and the air are supplied together. A portion of the synthesis gas (SG) is supplied as fuel to the second combustor 800, so that no separate fuel such as fossil fuel, etc., is required.

A portion of the synthesis gas (SG) may be expanded by a gas expander 820 before being supplied to the second combustor 800. Energy can be recovered from the high-temperature and high-pressure synthesis gas (SG) by the gas expander 820. However, the embodiment is not limited to this. Depending on the embodiment, the gas expander 820 may be omitted.

Figure 8:
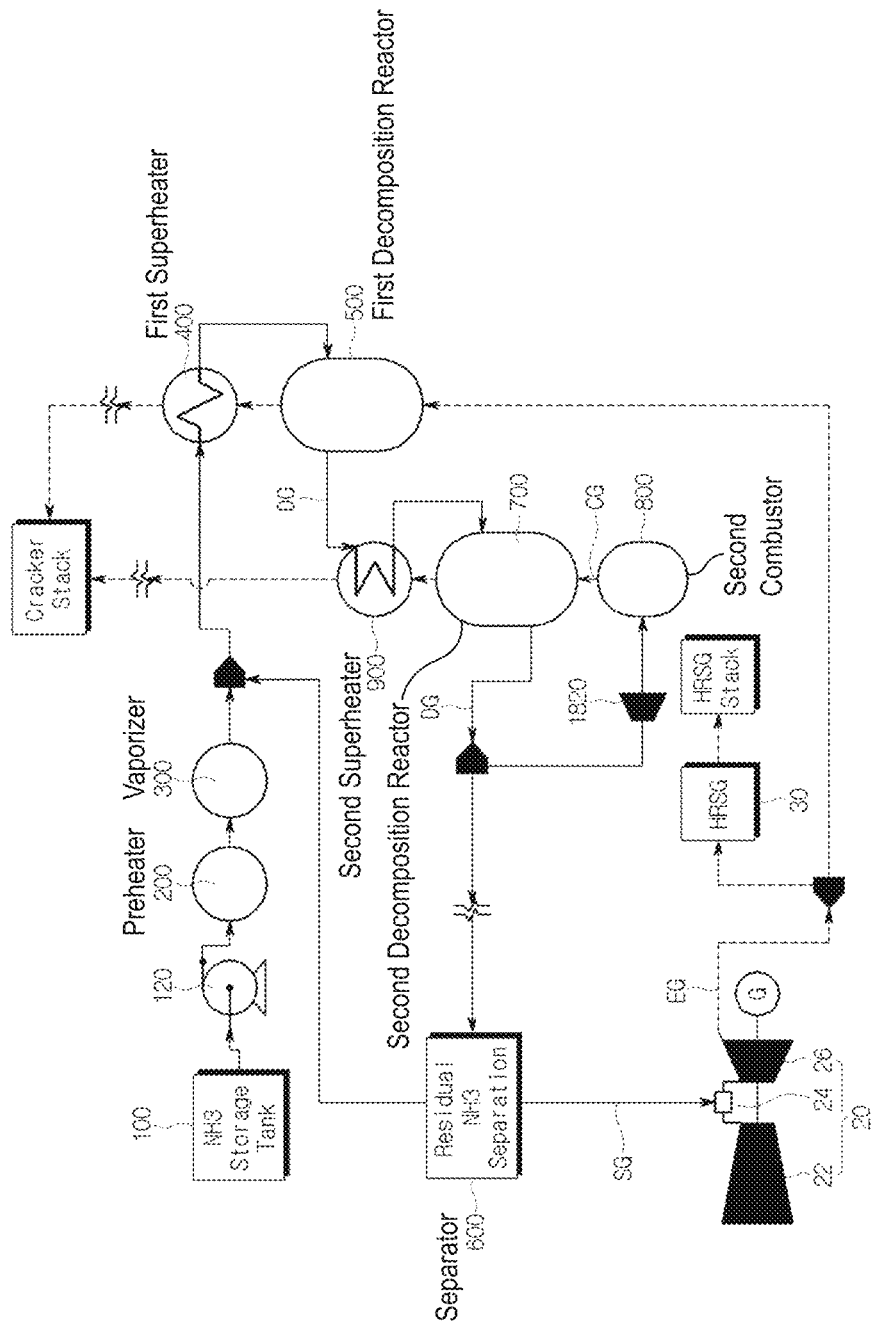
FIG. 8 is a schematic diagram of a gas turbine plant with an ammonia decomposition system according to an embodiment.

Alternatively, as shown in FIG. 8, a portion of the decomposition gas (DG) supplied to the separator 600 may be supplied to the second combustor 800 and is combusted. Here, it is desirable that the decomposition gas supplied to the second combustor 800 should be the final decomposition gas that has passed through both the first decomposition reactor 500 and the second decomposition reactor 700. Likewise, a portion of the decomposition gas (DG) may be expanded by a gas expander 1820 before being supplied to the second combustor 800.

Figure 9:
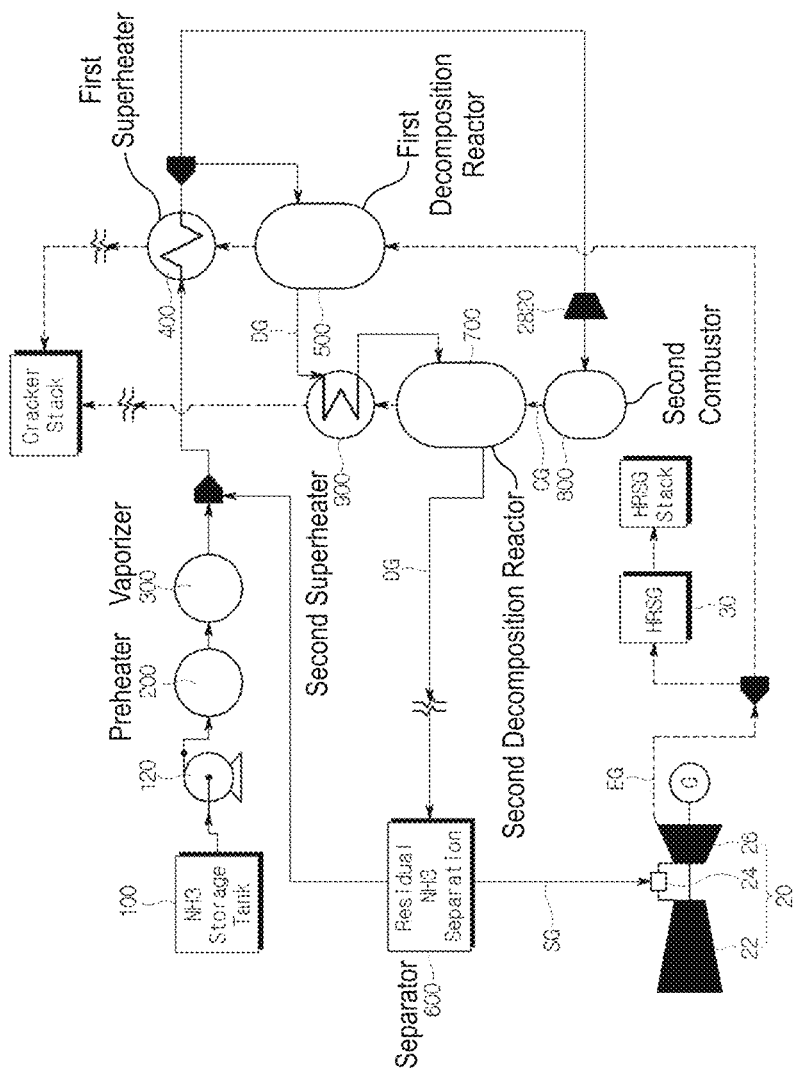
FIG. 9 is a schematic diagram of a gas turbine plant with an ammonia decomposition system according to an embodiment.
Figure 10:
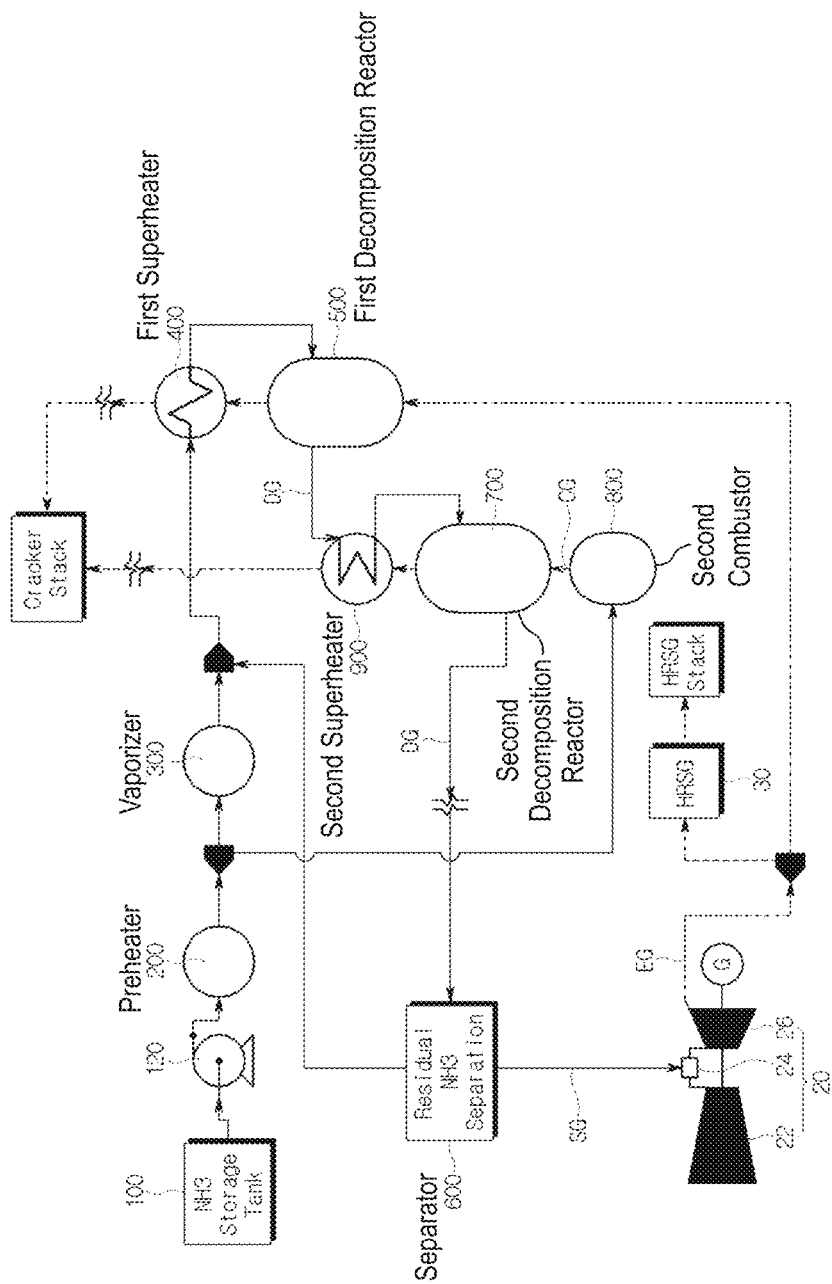
FIG. 10 is a schematic diagram of a gas turbine plant with an ammonia decomposition system according to an embodiment.

Also, as shown in FIGS. 9 and 10, the ammonia present in the ammonia decomposition system 10 may be supplied to the second combustor 800 and is combusted.

Specifically, in FIG. 9, a portion of the gaseous ammonia superheated in the first superheater 400 is supplied to the second combustor 800 and is combusted. According to this, since the gaseous ammonia having the highest temperature in the ammonia decomposition system 10 is supplied, efficiency can be improved. A portion of the gaseous ammonia superheated in the first superheater 400 may be expanded by a gas expander 2820 before being supplied to the second combustor 800.

In FIG. 10, a portion of the liquid ammonia preheated in the preheater 200 is supplied to the second combustor 800 and is combusted. According to this, since the liquid ammonia takes away residual heat while vaporizing within the second combustor 800, a combustion temperature is lowered as much as the residual heat, which can help suppress a nitrogen oxide production reaction.

Figure 11:
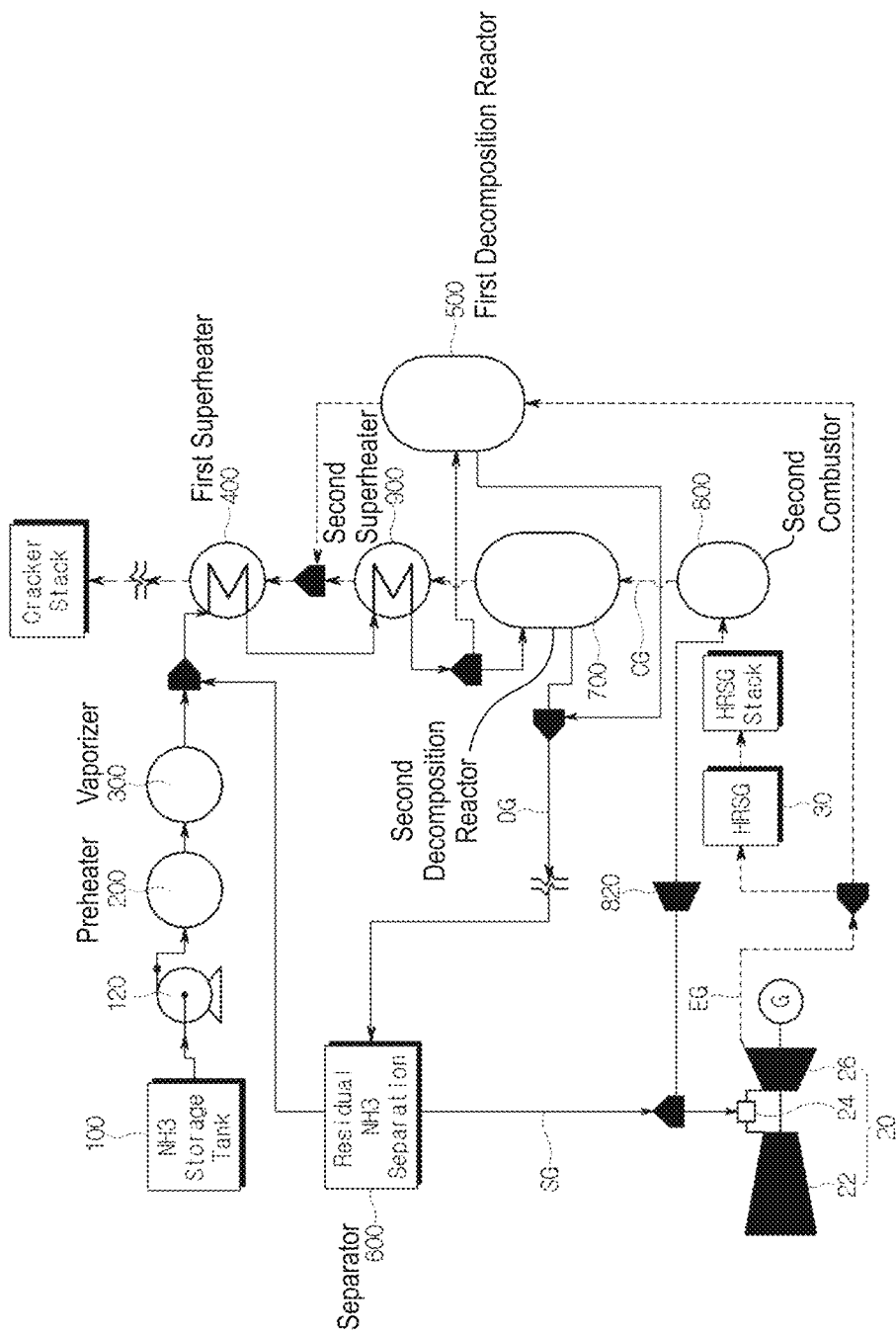
FIG. 11 is a schematic diagram of a gas turbine plant with an ammonia decomposition system according to an embodiment.

Finally, referring to FIG. 11, the second decomposition reactor 700 is arranged in parallel with the first decomposition reactor 500. Accordingly, the gaseous ammonia superheated through the first superheater 400 and the second superheater 900 is divided and supplied to the first decomposition reactor 500 and the second decomposition reactor 700. The first decomposition reactor 500 and the second decomposition reactor 700 each thermally decompose the gaseous ammonia, and the decompose gas (DG) decomposed in the first decomposition reactor 500 and the decomposition gas (DG) decomposed in the second decomposition reactor 700 are finally mixed and supplied to the separator 600.

Here, the combustion gas (CG) that has supplied heat while passing through the second decomposition reactor 700 and the second superheater 900 may be mixed with the exhaust gas (EG) that has supplied heat while passing through the first decomposition reactor 500 and may be supplied as a heat source of the first superheater 400.

Likewise, in addition to the first decomposition reactor 500 and the first superheater 400, the second decomposition reactor 700 and the second superheater 900 are provided, and the combustion gas (CG) generated by the separate second combustor 800 supplies heat to the second decomposition reactor 700. Accordingly, the ammonia can be effectively thermally decomposed at a higher temperature.

The present invention is not limited to the described specific embodiments and descriptions described above. Various modifications can be made by anyone skilled in the art without departing from the subject matter of the present invention as defined by the appended claims. Such modifications fall within the scope of protection of the present invention.

REFERENCE NUMERALS

10: Ammonia Decomposition System
20: Gas Turbine
22: Compressor
24: First Combustor
26: Turbine
30: Heat Recovery Steam Generator
40: Heat Transfer Fluid Circuit
42: Storage Tank
44: Pump
45: Additional Pump
46: First Heat Exchanger
100: Storage Tank
120: Supply Pump
200: Preheater
300: Vaporizer
400: First Superheater
500: First Decomposition Reactor
600: Separator
700: Second Decomposition Reactor
800: Second Combustor
820, 1820, 2820: Gas Expander
900: Second Superheater
EG: Exhaust Gas
DG: Decomposition Gas
SG: Synthesis Gas
CG: Combustion Gas

What is claimed is:

1. A gas turbine plant with an ammonia decomposition system, the gas turbine plant comprising:
   a storage tank configured to store liquid ammonia;
   a supply pump configured to supply the liquid ammonia from the storage tank;
   a preheater configured to preheat the liquid ammonia supplied by the supply pump;

a vaporizer configured to vaporize at least a portion of the liquid ammonia preheated by the preheater to form a gaseous ammonia;

a first superheater configured to superheat the gaseous ammonia vaporized by the vaporizer;

a first decomposition reactor of the ammonia decomposition system configured to thermally decompose at least a portion of the gaseous ammonia superheated by the first superheater to form a first decomposition gas; and a second superheater that superheats the first decomposition gas decomposed by the first decomposition reactor and supplies the superheated first decomposition gas to a second decomposition reactor;

the second decomposition reactor thermally decomposed at least a portion of a residual ammonia contained in the superheated first decomposition gas to form a second decomposition gas;

a separator configured to receive at least a portion of the second decomposition gas from the second decomposition reactor and separate a residual ammonia contained in the at least a portion of the second decomposition gas to form a synthesis gas consisting of hydrogen and nitrogen;

wherein at least a portion of the synthesis gas exhausted from the separator is supplied to a first combustor of a gas turbine of the gas turbine plant to form an exhaust gas, wherein the exhaust gas discharged from the gas turbine is branched as a first portion of the exhaust gas supplying heat while passing through the first decomposition reactor and as a second portion of the exhaust gas supplied to a heat recovery steam generator, wherein the gas turbine plant further comprises a second combustor configured to generate a combustion gas that supplies heat while passing through the second decomposition reactor and the second superheater.

2. The gas turbine plant with the ammonia decomposition system of claim 1, wherein the residual ammonia contained in the at least a portion of the second decomposition gas and separated by the separator is mixed with the gaseous ammonia vaporized by the vaporizer and is supplied to the first superheater.

3. The gas turbine plant with the ammonia decomposition system of claim 1, wherein the first portion of the exhaust gas that has passed through the first decomposition reactor supplies heat while passing through the first superheater.

4. The gas turbine plant with the ammonia decomposition system of claim 1, wherein the second decomposition reactor is arranged in series downstream of the first decomposition reactor, and the first decomposition gas discharged from the first decomposition reactor is supplied to the second decomposition reactor through the second superheater.

5. The gas turbine plant with the ammonia decomposition system of claim 1, wherein the second decomposition gas that is exhausted from the second decomposition reactor is branched as the portion of the second decomposition gas received by the separator and as a second portion of the second decomposition gas supplied to the second combustion and is combusted, or wherein the synthesis gas that is exhausted from the separator is branched as the portion of the synthesis gas supplied to the first combustor and as a second portion of the synthesis gas supplied to the second combustor and is combusted.

6. The gas turbine plant with the ammonia decomposition system of claim 5, wherein the second portion of the second decomposition gas exhausted from the second decomposition reactor or the second portion of the synthesis gas exhausted from the separator is expanded by a gas expander before being supplied to the second combustor.

7. The gas turbine plant with an ammonia decomposition system of claim 1, wherein the liquid ammonia exhausted from the preheater is branched as the portion of the liquid ammonia received by the vaporizer and as a second portion of the liquid ammonia supplied to the second combustor and is combusted, or wherein the gaseous ammonia exhausted from the first superheater is branched as the portion of the gaseous ammonia received by the first decomposition reactor and as a second portion of the gaseous ammonia supplied to the second combustor and is combusted.

8. The gas turbine plant with an ammonia decomposition system of claim 7, wherein the second portion of the gaseous ammonia exhausted from the first superheater is expanded by a gas expander before being supplied to the second combustor.

* * * * *